US012798642B2

(12) United States Patent
Rice et al.

(10) Patent No.: US 12,798,642 B2
(45) Date of Patent: Nov. 17, 2026

(54) RIDE AND PLAY RIDE-ON

(71) Applicant: The Radio Flyer Company, Chicago, IL (US)

(72) Inventors: Erin Rice, Chicago, IL (US); Anne Goodman, Chicago, IL (US); Jason Fitzwater, Chicago, IL (US)

(73) Assignee: The Radio Flyer Company, Chicago, IL (US)

( * ) Notice: Subject to any disclaimer, the term of this patent is extended or adjusted under 35 U.S.C. 154(b) by 172 days.

(21) Appl. No.: 18/775,641

(22) Filed: Jul. 17, 2024

(65) Prior Publication Data

US 2025/0025799 A1 Jan. 23, 2025

Related U.S. Application Data

(60) Provisional application No. 63/513,978, filed on Jul. 17, 2023.

(51) Int. Cl.
*A63H 33/00* (2006.01)
*A63H 3/52* (2022.01)
(Continued)

(52) U.S. Cl.
CPC ............... *B62B 3/007* (2013.01); *A63H 3/52* (2013.01); *A63H 33/003* (2013.01); *B62K 9/00* (2013.01)

(58) Field of Classification Search
CPC .. B62B 3/007; B62B 3/02; B62B 7/12; B62K 9/00; A63H 3/003; A63H 3/005; A63H 3/52; A63H 33/003
(Continued)

(56) References Cited

U.S. PATENT DOCUMENTS 288,662 A * 11/1883 Reed ......................... B62B 7/12 280/30
3,079,172 A * 2/1963 Burwell ............... B62K 15/008 280/37
(Continued)

FOREIGN PATENT DOCUMENTS

EP 2550890 A2 * 1/2013 ............... A45C 9/00
JP 2011067601 A * 4/2011 ........... A63H 17/004

OTHER PUBLICATIONS

"Kiddieland My First Minnie Ride On," accessed online at https://shorturl.at/sBJNZ (admitted prior art Jul. 17, 2023) (8 pages).
(Continued)

*Primary Examiner* — Alexander R Niconovich
(74) *Attorney, Agent, or Firm* — Barnes & Thornburg LLP

(57) ABSTRACT

A ride and play ride-on having a body made of a first housing portion and a second body portion. The first and second housing portions have front and rear wheels rotationally secured thereto. The body has a cavity that extends into the first housing portion and into the second housing portion. A hinge pivotally connects the first and second housing portions such that the ride-on has a first mode where the first housing portion is adjacent the second housing portion, and a second mode where the first housing portion is pivoted away from the second housing portion. A latch extends from one of the housing portions and engages a receiver in the other housing portion to selectively secure the ride-on in the first mode.

19 Claims, 6 Drawing Sheets

(51) Int. Cl.
*B62B 3/00* (2006.01)
*B62K 9/00* (2006.01)

(58) Field of Classification Search
USPC ........ 280/29, 30, 87.01; 446/71, 75, 78, 476
See application file for complete search history.

(56) References Cited

U.S. PATENT DOCUMENTS

| | | | | | |
|---|---|---|---|---|---|
| 3,316,993 | A * | 5/1967 | Weitzner | A45C 9/00 | 180/209 |
| 3,580,349 | A * | 5/1971 | Brennan | B62K 5/025 | 280/278 |
| 3,902,739 | A * | 9/1975 | Kimura | B62M 1/14 | 280/249 |
| 4,264,080 | A * | 4/1981 | Kassai | B62K 9/00 | 280/1.13 |
| D259,730 | S | 6/1981 | Arad | | |
| 4,346,908 | A * | 8/1982 | Kassai | A63H 33/00 | 280/87.021 |
| 4,424,978 | A * | 1/1984 | Kassai | A63G 19/18 | 446/337 |
| D282,088 | S * | 1/1986 | Kroll | D21/428 | |
| 4,572,530 | A * | 2/1986 | Marino | A63G 19/00 | 180/209 |
| 4,741,544 | A * | 5/1988 | Kassai | A63G 19/18 | 280/1.13 |
| 4,759,557 | A * | 7/1988 | Kassai | A63G 19/18 | 446/280 |
| D303,273 | S | 9/1989 | Takahashi | | |
| D317,334 | S | 6/1991 | Takahashi | | |
| 5,154,658 | A * | 10/1992 | Marcus | A63H 5/00 | 446/485 |
| D334,222 | S | 3/1993 | Krebs | | |
| D352,741 | S | 11/1994 | Nakai | | |
| 5,380,232 | A * | 1/1995 | Berggreen | A63H 33/04 | 446/75 |
| 5,474,483 | A * | 12/1995 | Sun | A63H 3/005 | 280/47.35 |
| 5,538,267 | A * | 7/1996 | Pasin | B62B 3/007 | 280/47.35 |
| D394,804 | S | 6/1998 | Sun | | |
| 6,176,759 | B1 * | 1/2001 | Trageser | A63H 11/12 | 446/272 |
| D449,861 | S | 10/2001 | Chiapetta | | |
| 6,296,268 | B1 * | 10/2001 | Ford | A47D 13/043 | 280/648 |
| 6,446,981 | B1 * | 9/2002 | Wise | B62B 3/007 | 280/30 |
| 6,474,659 | B1 * | 11/2002 | Horchler | A63G 19/18 | 446/460 |
| 6,520,513 | B2 * | 2/2003 | Presley-Mays | A47C 9/027 | 280/47.35 |
| 7,222,866 | B1 * | 5/2007 | Cahoj | B62B 3/007 | 280/30 |
| D640,755 | S | 6/2011 | Herlitz | | |
| 8,297,628 | B2 * | 10/2012 | Zak | A47K 11/02 | 280/638 |
| D675,680 | S | 2/2013 | Long | | |
| 8,419,498 | B2 * | 4/2013 | Furusawa | A63H 17/004 | 446/470 |
| 8,517,403 | B2 * | 8/2013 | Jessie, Jr. | B62K 9/00 | 280/7.1 |
| 8,523,193 | B1 * | 9/2013 | Mucaro | B62K 9/00 | 280/7.15 |
| 8,790,152 | B2 * | 7/2014 | Schlegel | B62K 9/00 | 446/478 |
| D719,618 | S | 12/2014 | Herlitz | | |
| D755,306 | S | 5/2016 | Lee | | |
| 10,265,637 | B2 * | 4/2019 | Bernbaum | B62B 7/12 | |
| 10,308,270 | B2 * | 6/2019 | Joos | B62B 9/26 | |
| D888,839 | S | 6/2020 | Herlitz | | |
| D892,938 | S | 8/2020 | Sturgeon | | |
| D916,201 | S | 4/2021 | Zemskov | | |
| 11,291,279 | B2 * | 4/2022 | Liu | A45C 13/36 | |
| D980,339 | S | 3/2023 | Rigby | | |
| 2020/0330895 | A1 * | 10/2020 | Hansen | A63H 33/086 | |
| 2021/0339155 | A1 * | 11/2021 | Reitano | A47L 9/2842 | |

OTHER PUBLICATIONS

"Fisher-Price Little People Music Parade Ride On," accessed online at https://shorturl.at/fyAR8 (admitted prior art Jul. 17, 2023) (9 pages).
"Moose Mountain Toymakers Race Day Play Set Ride-On," accessed online at https://shorturl.at/mJU78 (admitted prior art Jul. 17, 2023) (2 pages).
"Fisher Price Little People School Bus Ride On," accessed online at https://shorturl.at/bgtAW (admitted prior art Jul. 17, 2023) (4 pages).
International Search Report and Written Opinion for PCT/US2024/038349 mailed Nov. 1, 2024 (11 pages).

* cited by examiner

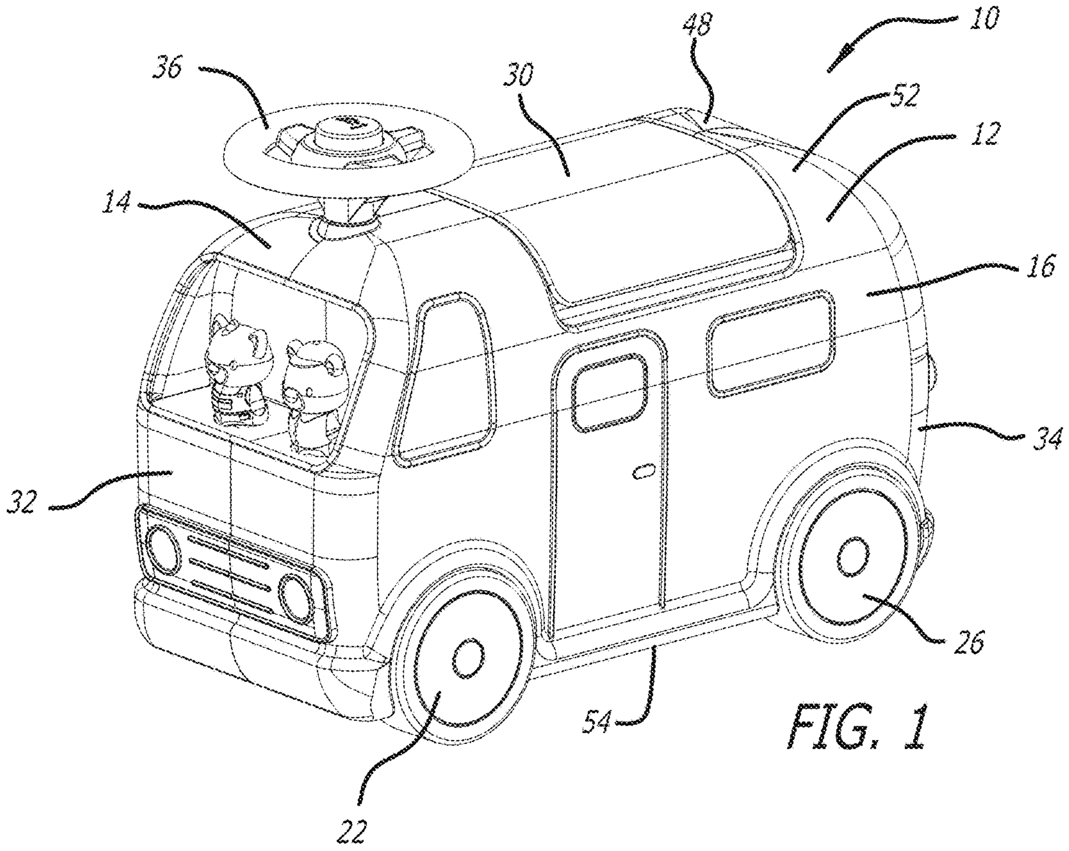
FIG. 1
FIG. 2
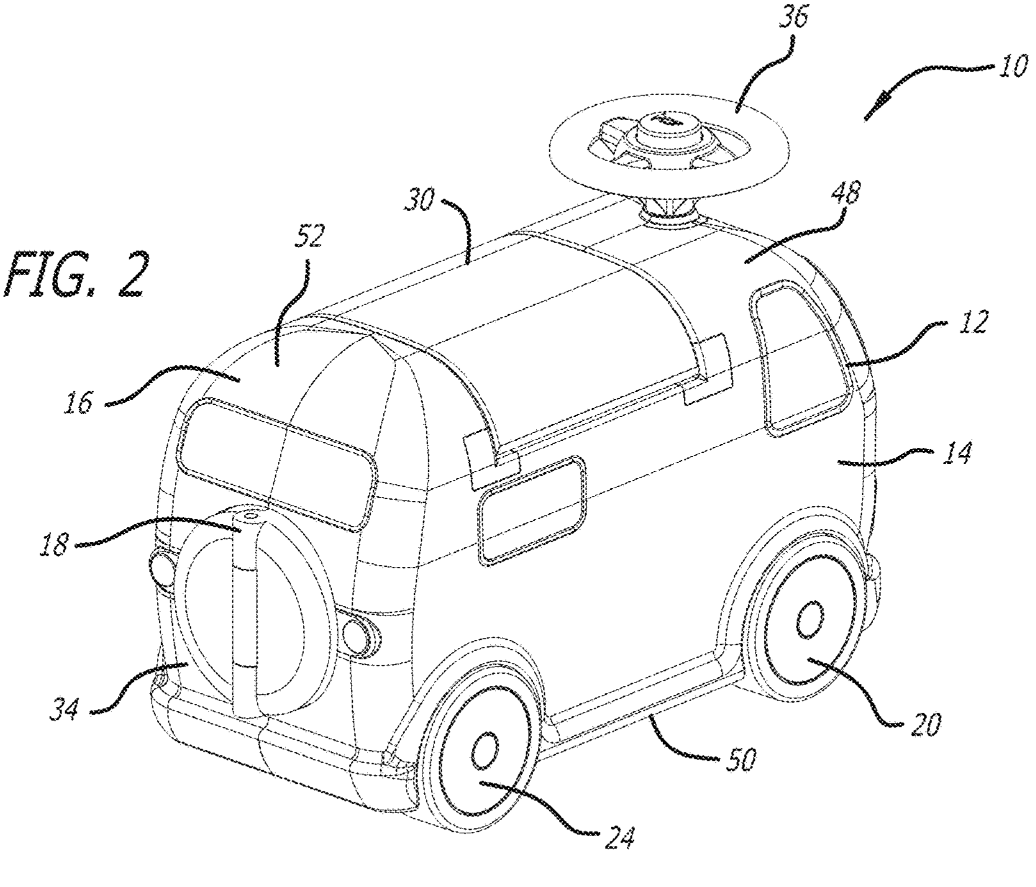

FIG. 9
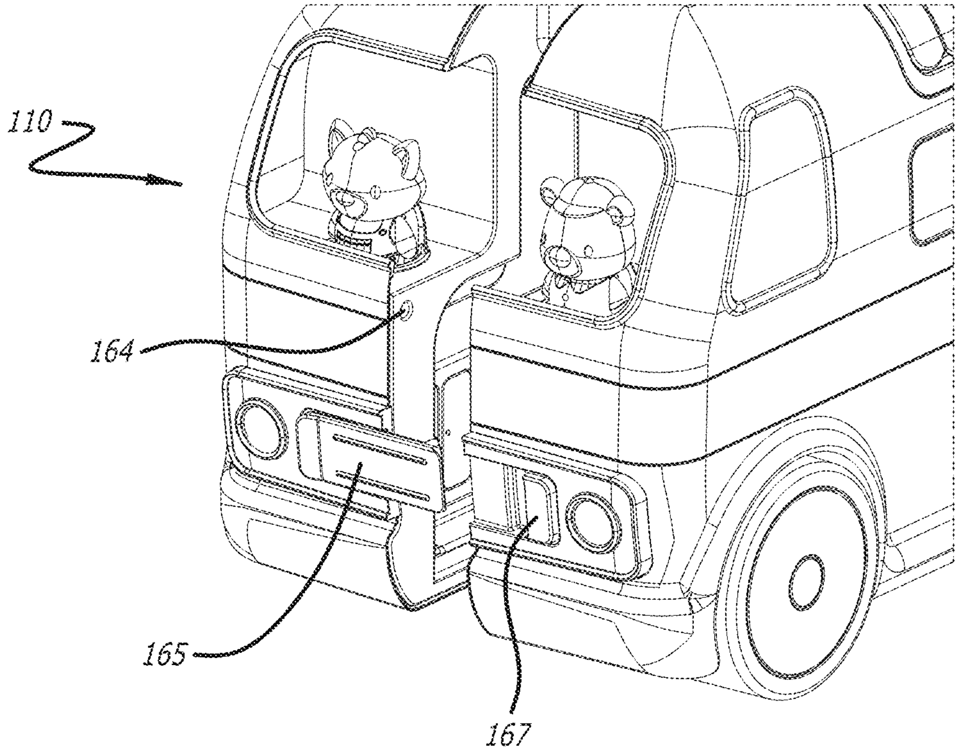
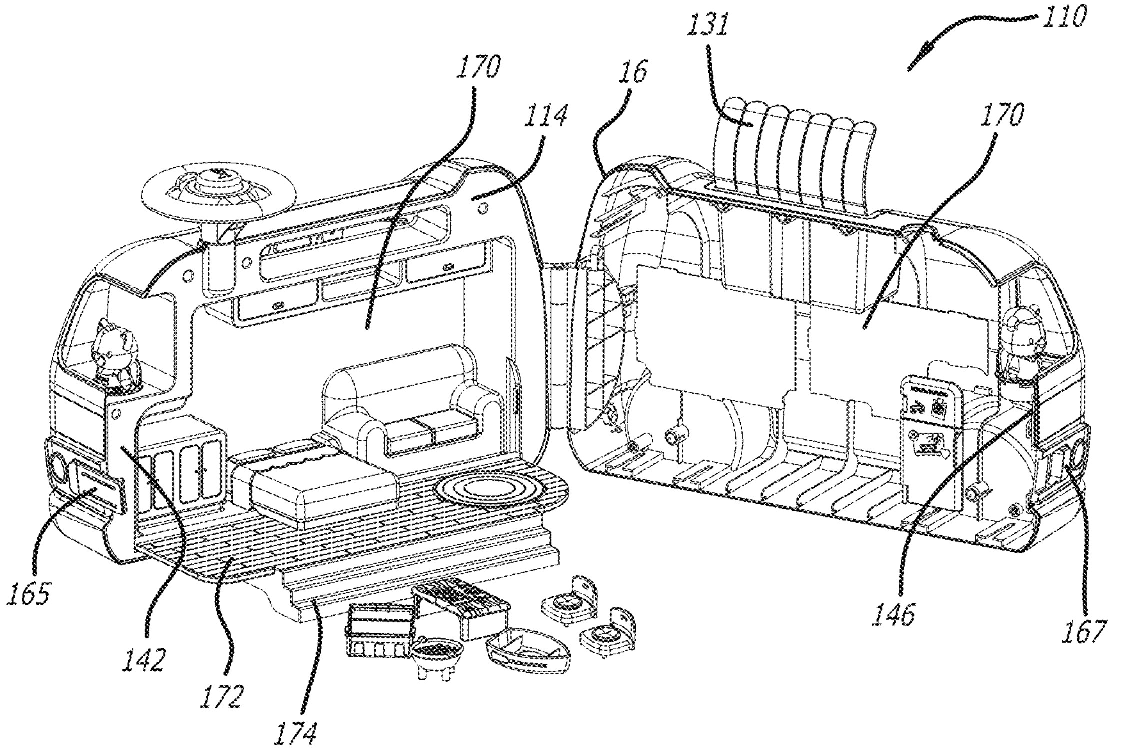
FIG. 10

RIDE AND PLAY RIDE-ON

CROSS-REFERENCE TO RELATED APPLICATIONS

This application claims the benefit of U.S. Provisional Patent Application No. 63/513,978 filed Jul. 17, 2023, which is expressly incorporated herein by reference and made a part hereof.

FEDERALLY SPONSORED RESEARCH OR DEVELOPMENT

Not Applicable.

TECHNICAL FIELD

The present subject matter relates to a ride-on toy, and more particularly, to a ride-on toy that opens into a play set.

BACKGROUND

Ride-on toys are known in the art. While such products according to the prior art provide a number of advantages, they nevertheless have certain limitations, especially when combined together. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a ride-on toy that opens into a play set.

The disclosed technology further relates to a ride and play ride-on, comprising: a body having a first housing portion and a second housing portion; the first housing portion having a first end, a second end, an inner side, an outer side, a top and a bottom, the first housing portion also having a front wheel rotationally secured to the first housing portion adjacent the bottom and the first end thereof, and a rear wheel rotationally secured to the first housing portion adjacent the bottom and the second end thereof; the second housing portion having a first end, a second end, an inner side and an outer side, a top and a bottom, the second housing portion also having a front wheel rotationally secured to the second housing portion adjacent the bottom and the first end thereof, and a rear wheel rotationally secured to the second housing portion adjacent the bottom and the second end thereof; a hinge pivotally connecting the first and second housing portions at the second ends of the first and second housing portions, wherein the ride-on has a first mode where the inner side of the first housing portion is adjacent the inner side of the second housing portion, and wherein the ride-on has a second mode where the first housing portion is pivoted away from the second housing portion at the hinge; a latch extending from one of the first end of the first housing portion and the first end of the second housing portion, a receiver at the other of the first end of the first housing portion and the first end of the second housing portion, wherein the latch engages the receiver when the ride-on is in the first mode, and wherein the latch can be disengaged from the receiver in the second mode to allow the first housing portion to be pivoted away from the second housing portion at the hinge; and, a steering wheel extending from the top of one of the first housing portion and the second housing portion.

The disclosed technology further relates to a ride and play ride-on, comprising: a body having a first housing portion, a second housing portion, and a cavity therebetween; the first housing portion having a first end, a second end, an inner side, an outer side, a top and a bottom, the first housing portion also having a front wheel rotationally secured to the first housing portion adjacent the bottom and the first end thereof, and a rear wheel rotationally secured to the first housing portion adjacent the bottom and the second end thereof; the second housing portion having a first end, a second end, an inner side and an outer side, a top and a bottom, the second housing portion also having a front wheel rotationally secured to the second housing adjacent the bottom and the first end thereof, and a rear wheel rotationally secured to the second housing portion adjacent the bottom and the second end thereof; a hinge pivotally connecting the first and second housing portions at the second ends of the first and second housing portions, wherein the ride-on has a first mode where the inner side of the first housing portion is adjacent the inner side of the second housing portion, and wherein the ride-on has a second mode where the first housing portion is pivoted away from the second housing portion at the hinge; a latch extending from one of the first end of the first housing portion and the first end of the second housing portion, a receiver at the other of the first end of the first housing portion and the first end of the second housing portion, wherein the latch engages the receiver when the ride-on is in the first mode, and wherein the latch can be disengaged from the receiver in the second mode to allow the first housing portion to be pivoted away from the second housing portion at the hinge; and, a seat at the top of the first and second housing portions between the first end and the second end of the first and second housing portions.

The disclosed technology further relates to a ride and play ride-on, comprising: a body having a first housing portion and a second housing portion; the first housing portion having a first end, a second end, an inner side, an outer side, a top and a bottom, the first housing portion also having a front wheel rotationally secured to the first housing portion, and a rear wheel rotationally secured to the first housing portion; the second housing portion having a first end, a second end, an inner side and an outer side, a top and a bottom, the second housing portion also having a front wheel rotationally secured to the second housing portion, and a rear wheel rotationally secured to the second housing portion; wherein the body has a cavity that extends into the first housing portion adjacent the inner side thereof and into the second housing portion adjacent the inner side thereof; a hinge pivotally connecting the first and second housing portions at the second ends of the first and second housing portions, wherein the ride-on has a first mode where the inner side of the first housing portion is adjacent the inner side of the second housing portion, and wherein the ride-on has a second mode where the first housing portion is pivoted away from the second housing portion at the hinge; and, a latch extending from one of the first end of the first housing portion and the first end of the second housing portion, a receiver at the other of the first end of the first housing portion and the first end of the second housing portion, wherein the latch engages the receiver when the ride-on is in the first mode, and wherein the latch can be disengaged from the receiver in the second mode to allow the first housing portion to be pivoted away from the second housing portion at the hinge.

The disclosed technology further relates to a ride and play ride-on, wherein the front wheel rotationally secured to the first housing portion at the first end thereof is adjacent the outer side of the first housing portion, and wherein the rear wheel rotationally secured to the first housing portion at the second end thereof is adjacent the outer side of the first housing portion.

The disclosed technology further relates to a ride and play ride-on, wherein the front wheel rotationally secured to the second housing portion adjacent the first end thereof is also adjacent the outer side of the second housing portion, and wherein the rear wheel rotationally secured to the second housing portion adjacent the second end thereof is also adjacent the outer side of the second housing portion.

The disclosed technology further relates to a ride and play ride-on, further comprising a seat at the top of the first and second housing portions between the first end and the second end of the first and second housing portions.

The disclosed technology further relates to a ride and play ride-on, wherein a portion of the seat comprises a cover for a storage cavity.

The disclosed technology further relates to a ride and play ride-on, further comprising magnets on the inner side of one of the first and second housing portions to assist in securing the first and second housing portions together in the first mode.

The disclosed technology further relates to a ride and play ride-on, wherein the body has a cavity that extends into the first housing portion at the inner side thereof and into the second housing portion at the inner side thereof.

The disclosed technology further relates to a ride and play ride-on, further comprising a fold down floor pivotally connected to one of the first and second housing portions, the fold down floor pivoting from an up position within the cavity to a lowered position to form a floor extending from one of the first and second housing portions when the ride-on is in the second mode.

The disclosed technology further relates to a ride and play ride-on, further having a seat back formed by an upper surface of the first and second housing portions.

The disclosed technology further relates to a ride and play ride-on, further comprising a steering wheel extending from the top of one of the first housing portion and the second housing portion.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings:

FIG. 1 is a front top perspective view of a ride and play ride-on, with the ride-on in the first mode or ride-on mode, according to the present disclosure.

FIG. 2 is a top rear perspective view of the ride and play ride-on of FIG. 1, according to the present disclosure.

FIG. 9 is a front perspective view of the ride and play ride-on of FIG. 5, according to the present disclosure, upon initial opening of the body to show the latch and receiver.

FIG. 10 is a perspective view of the ride and play ride-on of FIG. 5, with the ride-on open in play mode, according to the present disclosure.

Figure 3:
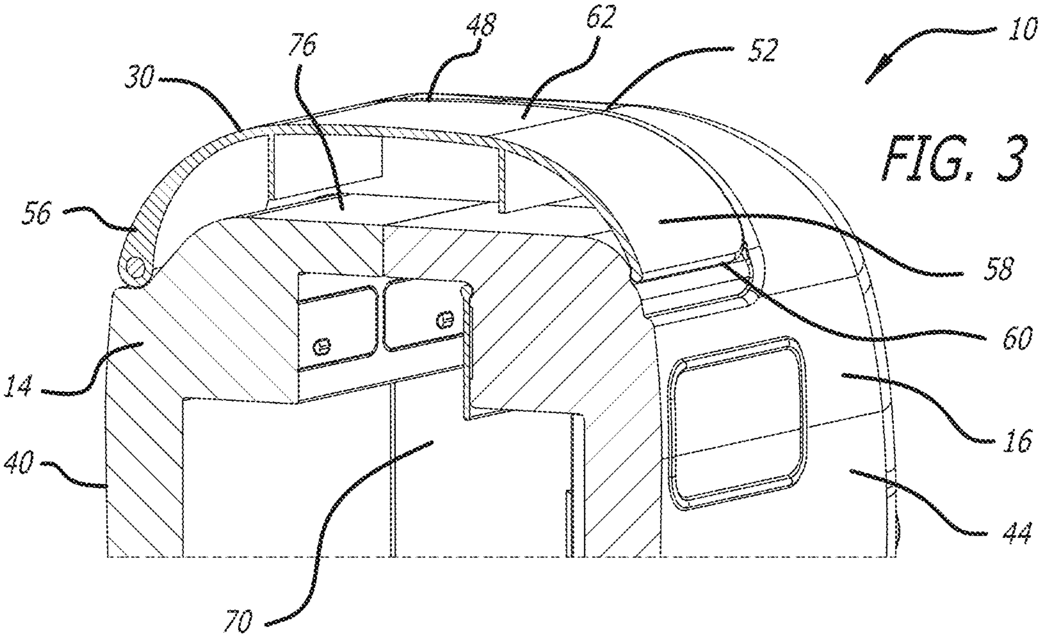
FIG. 3 is a cross sectional view of the ride and play ride-on of FIG. 1, according to the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law.

Figure 4:
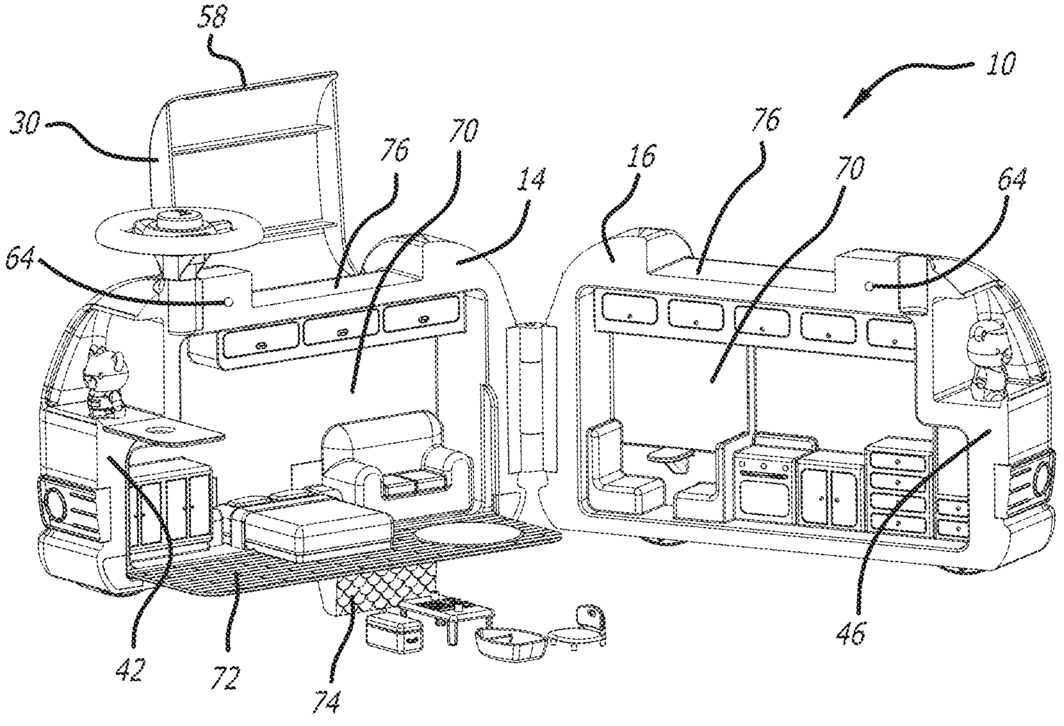
FIG. 4 is a perspective view of the ride and play ride-on of FIG. 1, with the ride-on open in play mode, according to the present disclosure.

Generally, this disclosure describes several embodiments of a ride and play ride-on 10 that is arrangeable in a variety of different orientations, both alone and in combination, and which have a variety of different functionality. In various embodiments, the ride and play ride-on 10 is operable in two modes, a ride-on mode as shown in FIGS. 1-2 and 5-6, and a play mode as shown in FIGS. 4 and 10. Further, in various embodiments, the ride and play ride-on 10 opens for play mode, and closes for ride-on mode.

Referring now to the figures, and initially to FIGS. 1-4 and 5-11, there are shown various embodiments of the ride and play ride-on, including the embodiment of the ride and play ride-on 10 shown in FIGS. 1-4, and the embodiment of the ride and play ride-on 100 shown in FIGS. 5-11. In the figures and description, like components use like reference numbers (the embodiment of FIGS. 5-11 using the 100 series reference numbers).

In various embodiments, the ride and play ride-on 10, 110 has a body 12, 112 that comprises a first housing portion 14, 114 and a second housing portion 16, 116 and a hinge 18, 118 pivotally connecting the first housing portion 14, 114 to the second housing portion 16, 116. The first housing portion 14, 114 and second housing portion 16, 116 operate in a clam-shell like manner via the hinge 18, 118 to open and close. The ride-on 10, 110 also has a first front wheel 20, 120 rotationally secured to the first housing portion 14, 114, a second front wheel 22, 122 rotationally secured to the second housing portion 16, 116, a first rear wheel 24, 124 rotationally secured to the first housing portion 14, 114, and a second rear wheel 26, 126 rotationally secured to the second housing portion 16, 116.

The ride and play ride-on 10, 110 has a seat 30, 130. In the embodiment of FIGS. 1-4 the seat 30 is pivotally connected to the first housing portion 14. The seat 30 removably connects to the second housing portion 16 to secure the second housing portion 16 to the first housing portion 14 in ride-on mode (see FIGS. 1-3), and the seat 30 disconnects from the second housing portion 16 in play mode to allow the second housing portion 16 to pivot away from the first housing portion 14 (see FIG. 4). In the ride-on mode the user can sit on the seat 30, 130 and ride on the ride-on 10, 110 by pushing their feet on the floor to roll the ride-on 10, 110 since the wheels 20, 22, 24, 26 and 120, 122, 124, 126 rotate. In a preferred embodiment, each wheel 20, 22, 24, 26 and 120, 122, 124, 126 rotates independently.

In one embodiment, the body 12, 112 of the ride-on 10, 110 has a first end 32, 132 at a front of the ride-on 10, 110 and a second end 34, 134 at the rear of the ride-on 10, 110. The first end 32, 132 of the body 12, 112 is also the first end 32, 132 of the first and second housing portions 14, 114 and 16, 116. Similarly, the second end 34, 134 of the body 12, 112 is also the second end 34, 134 of the first and second housing portions 14, 114 and 16, 116. The hinge 18, 118 is located at the second end 34, 134 of the body 12, 112. The hinge 18, 118 pivotally connects the first housing portion 14, 114 to the second housing portion 16, 116 at the second end 34, 134.

The ride-on 10, 110 also has a steering wheel 36, 136 adjacent the first end 32, 132 of the body 12, 112. In one embodiment the steering wheel 36, 136 rotates, however, it is not connected to the any of the wheels 20, 22, 24, 26, and 120, 122, 124, 126, and thus the wheels 20, 22, 24, 26 and 120, 122, 124, 126 do not turn when the steering wheel 36, 136 is turned or rotated. In various embodiment, the steering wheel 36, 136 extends from the top of one of the first housing portion 14, 114 or the second housing portion 16, 116.

The first housing portion 14, 114 has an outer side 40, 140 and an inner side 42, 142, and the second housing portion 16, 116 similarly has an outer side 44, 144 and an inner side 46, 146. The inner side 42, 142 of the first housing portion 14, 114 is adjacent the inner side 46, 146 of the second housing portion 16, 116 when the first and second housing portions 14, 114 and 16, 116 are in the ride-on mode.

The first housing portion 14, 114 also has a top 48, 148 and a bottom 50, 150, and the second housing portion 16, 116 similarly has a top 52, 152 and a bottom 54, 154. The first housing portion 14, 114 has a front wheel 20, 120 rotationally secured to the first housing portion 14, 114 adjacent the bottom 50, 150 and the first end 32, 132 thereof, and a rear wheel 24, 124 rotationally secured to the first housing portion 14, 114 adjacent the bottom 50, 150 and the second end 34, 134 thereof. Similarly, the second housing portion 16, 116 has a front wheel 22. 122 rotationally secured to the second housing portion 16, 116 adjacent the bottom 50, 150 and the first end 32, 132 thereof, and a rear wheel 26, 126 rotationally secured to the second housing portion 16, 116 adjacent the bottom 50, 150 and the second end 34, 134 thereof.

Referring to FIG. 3, in one embodiment the seat 30 has a first end 56 and a second end 58. In one embodiment first end 56 of the seat 30 is pivotally connected to the first housing portion 14 substantially adjacent the outer side 40 and top 48 of the first housing portion 14. The seat 30 pivots between a closed position, as shown in FIGS. 1-3, and an open position, as shown in FIG. 4. In one embodiment, the second end 58 of the seat 30 removably connects to the second housing portion 16 substantially adjacent the outer side 44 and top 52 of the second housing portion 16 when the seat is in the closed position. As shown in FIG. 3, in one embodiment, the second housing member 16 has a recess 60 that receives the second end 58 of the seat 30 to secure the seat 30 to the second housing member 16 when the seat 30 is in the closed position. Further, in one embodiment the outer surface 62 of the seat 30 generally matches the top 48 of the first housing portion 14 and top 52 of the second housing portion 16 when the seat 30 is in the closed position. Additionally, a depression 76 is provided in the first and second housings 14, 16 under the seat 30.

Figure 11:
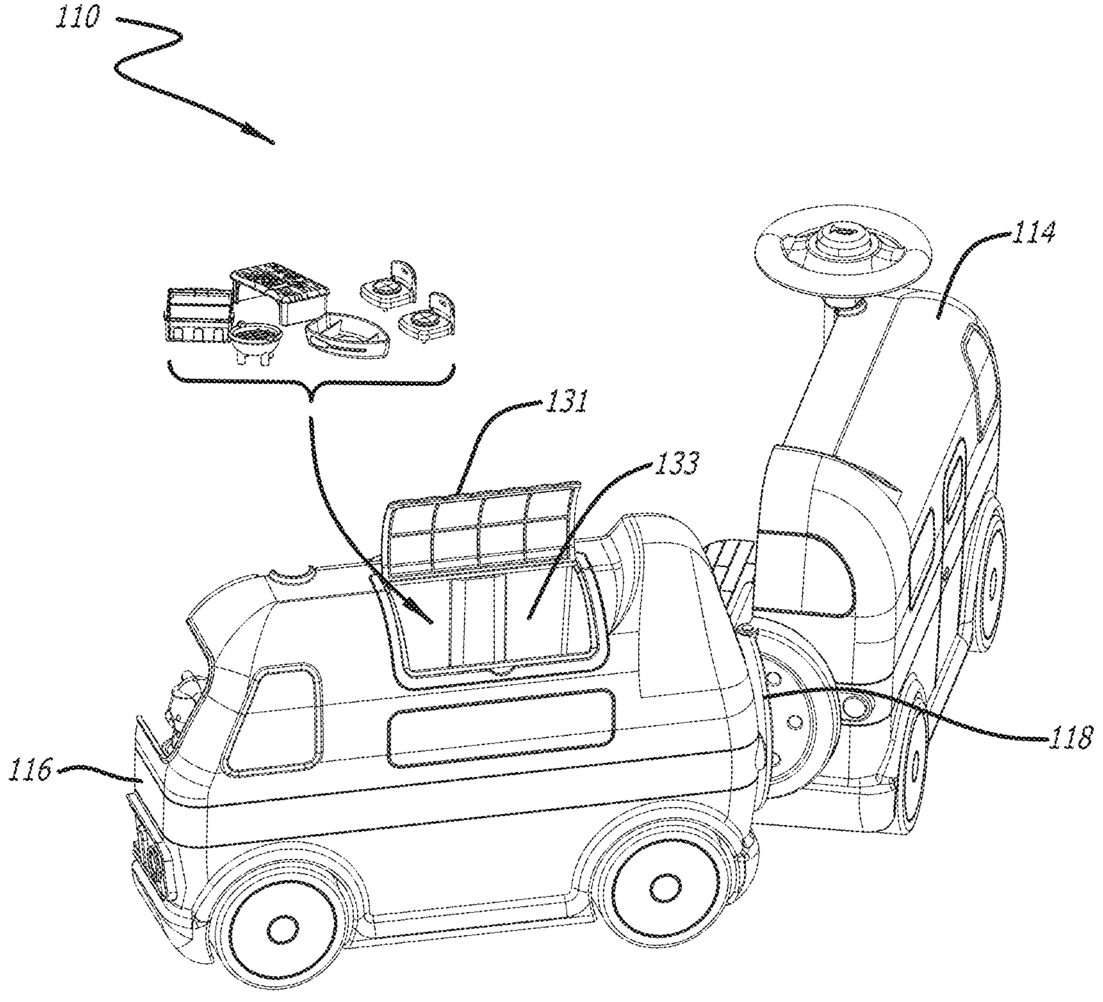
FIG. 11 is a rear perspective view of the ride and play ride-on of FIG. 5 with the ride-on open in play mode as shown in FIG. 10, to show a cavity under the seat, according to the present disclosure.

Referring to FIGS. 5-8 and 10-11, in another embodiment the seat 130 comprises the top surface 148, 152 of the first and second housings 114, 116 between the first end 132 and the second end 134 of the housings 114, 116. Further, in one embodiment, a portion of the seat 130 comprises a cover 131 for a storage cavity 133, such as storage cavity 133 in the second housing 116. In this embodiment, the cover 131 has a first end 156 and a second end 158. In one embodiment first end 156 of the cover 131 is pivotally connected to the second housing portion 116. The cover 131 pivots between a closed position, as shown in FIGS. 5-8, and an open position, as shown in FIGS. 10 and 11. Additionally, in one embodiment, the seat 130 has a seat back 135 formed by an angled upper surface 137 of the first and second housing portions 114, 116.

Further, in one embodiment, as shown in FIGS. 4 and 10, the ride-on 10, 110 may have a connector 64, 164, such as a magnet, snap, or detent connection, to assist in securing the first housing portion 14, 114 to the second housing portion 16, 116 in the ride-on mode. In one embodiment, the connector 64, 164 is provided at the first end 32, 132 of the ride-on 10, 110.

Figure 5:
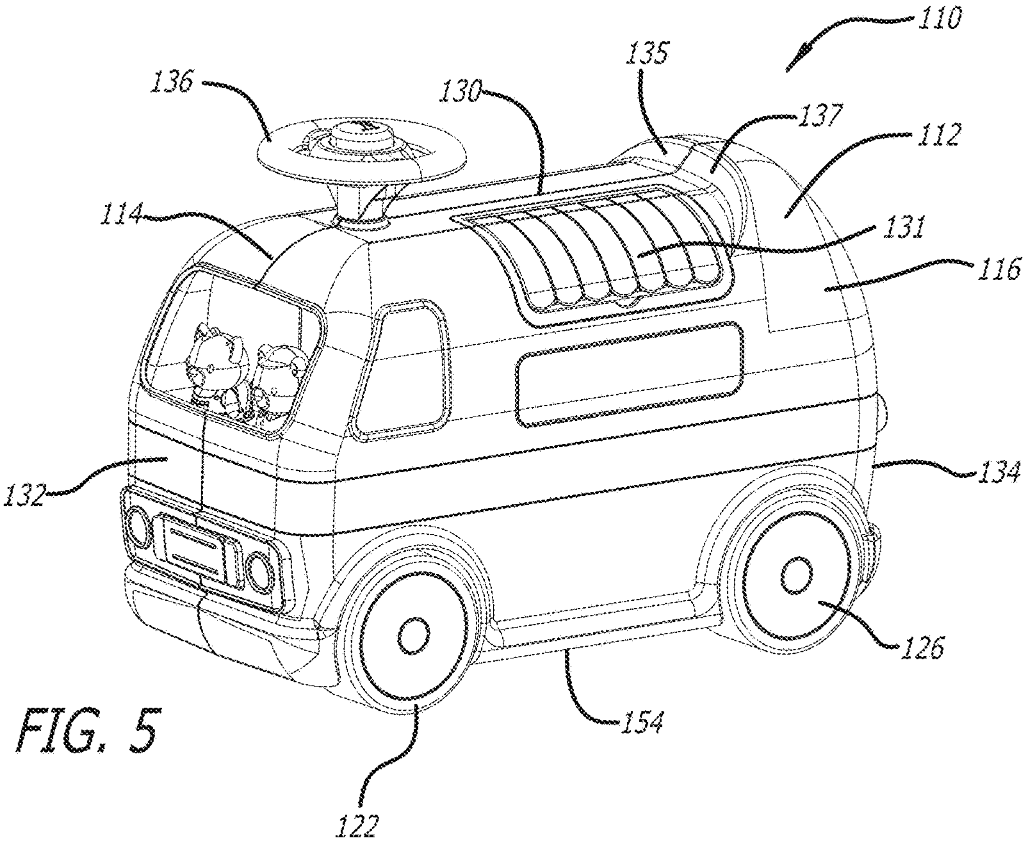
FIG. 5 is a front top perspective view of another embodiment of a ride and play ride-on, with the ride-on in the first mode or ride-on mode, according to the present disclosure.
Figure 6:
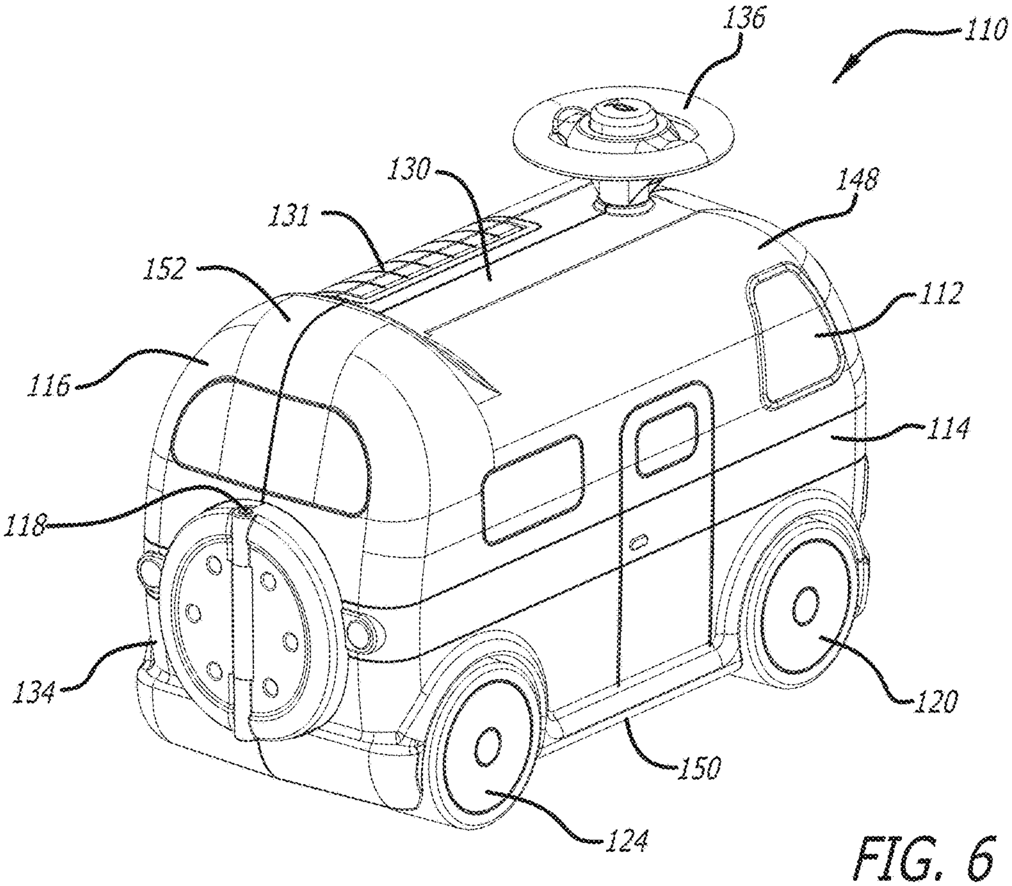
FIG. 6 is a top rear perspective view of the ride and play ride-on of FIG. 5, according to the present disclosure.
Figure 7:
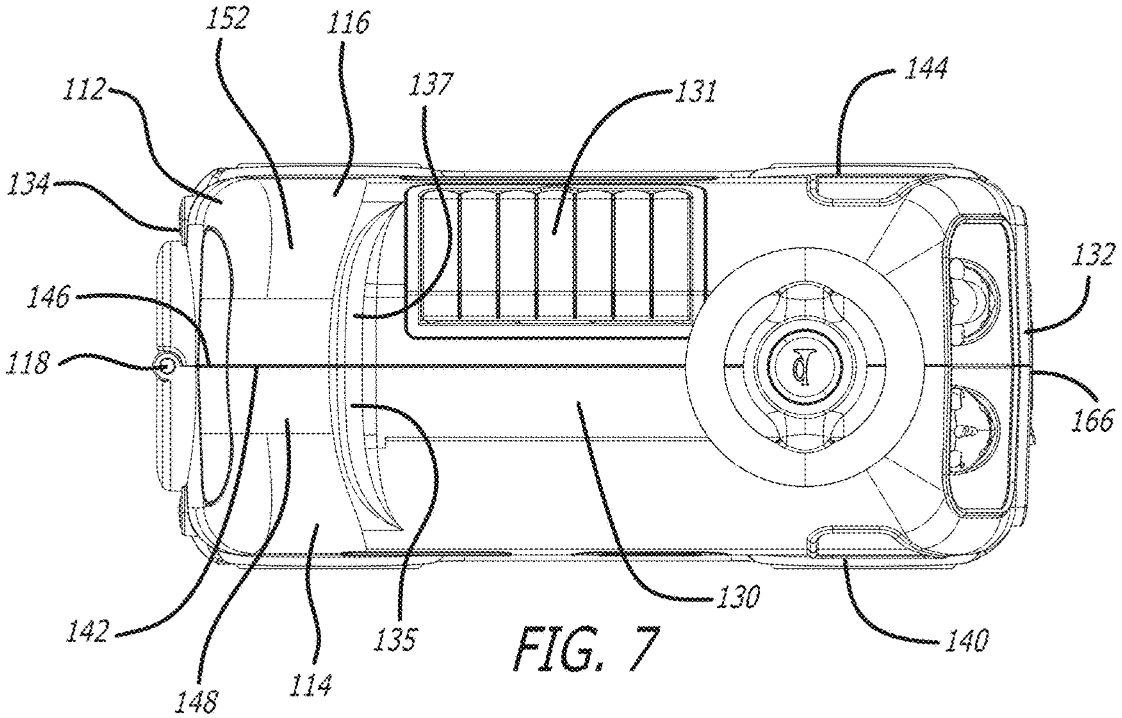
FIG. 7 is a top plan view of the ride and play ride-on of FIG. 5, according to the present disclosure.
Figure 8:
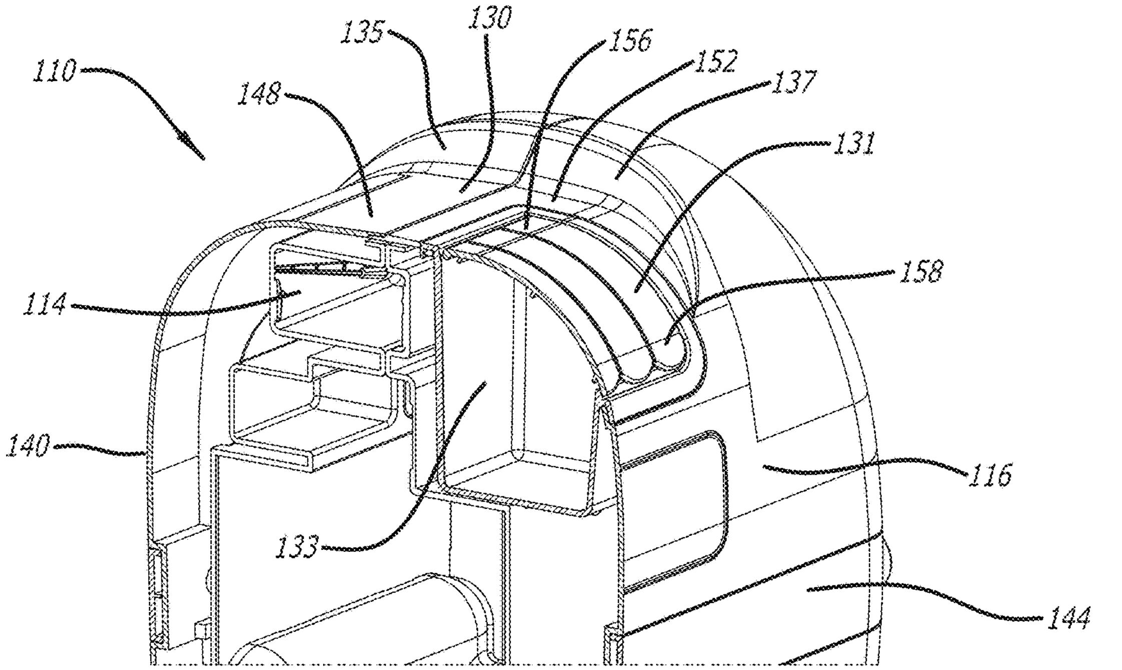
FIG. 8 is a cross sectional view of the ride and play ride-on of FIG. 5, according to the present disclosure.

Alternately or additionally, as shown in FIGS. 5, 9 and 10, the ride-on 110 may have a latch 165 extending from the first end 132 of either the first housing portion 114 or the second housing portion 116, and a receiver 167 at the first end 132 of the other of the first housing portion 114 or the second housing portion 116. The latch 165 engages the receiver 167 when the ride-on 110 is in the first mode to secure the first housing portion 114 to the second housing portion 116. But, the latch 165 can be pivoted and disengaged from the receiver 167 in the second mode to allow the first housing portion 114 to be pivoted away from the second housing portion 116 at the hinge 118.

Thus, the ride-on 10, 110 has a first mode (FIGS. 1-3 and 5-8) where the inner side 42, 142 of the first housing portion 14, 114 is adjacent the inner side 46, 146 of the second housing portion 16, 116, and a second mode (FIGS. 4 and 10) where the first housing portion 14. 114 is pivoted away from the second housing portion 16, 116 at the hinge 18, 118.

In the embodiment of FIGS. 1-4, to open the ride-on 10 and convert the ride-on 10 from ride-on mode to play mode the user pivots the seat 30 from the closed position to the open position as shown in FIG. 4. The user can then pivot the first end 32 of the first housing portion 14 away from the first end 32 of the second housing portion 16 by pulling the first and second housing portions 14, 16 apart at the first end 32 and pivoting them apart at the hinge 18. Similarly, in the embodiment of FIGS. 5-11, to open the ride-on 110 and convert the ride-on 110 from ride-on mode to play mode the user unlatches the latch 165 from the receiver 167. The user can then pivot the first end 132 of the first housing portion 114 away from the first end 132 of the second housing portion 116 by pulling the first and second housing portions 114, 116 apart at the first end 132 and pivoting them apart at the hinge 118.

As shown in FIGS. 3-4, 8 and 10, a cavity 70, 170 exists between the interiors of the first and second housing members 14, 16 and 114, 116. In one embodiment the cavity 70, 170 extends into the first housing portion 14, 114 at the inner wall thereof, and into the second housing portion 16, 116 at the inner wall thereof. When the ride-on 110 is open, as shown in FIGS. 4 and 10, the user can play with the contents of the cavity 70, 170. In one embodiment, the cavity 70, 170 contains a fold down floor 72, 172 pivotally connected to one of the housing portions 14, 16, 114, 116. The fold down floor 72, 173 pivots from an up position within the cavity 70, 170 to a lowered position to form a floor extending from one of the housing portions 14, 16, 114, 116. The floor 72, 172 has a small step 74, 174 that assists in providing support for the ride-on 10, 110 in the play mode.

To close the ride-on 10, 110 and convert the ride-on 10, 110 from play mode to ride-on mode the user would pivot the floor 72, 172 up approximately 90°, insert all of the play items into the cavity 70, 170 or into the storage cavity 133, and pivot the first housing member 14, 114 and second housing member 16, 116 toward one another until the inner side 42, 142 of the first housing portion 14, 114 is adjacent the inner side 46, 146 of the second housing portion 16, 116. In one embodiment the connector 64 will engage when the two housing portions 14, 16 and 114, 116 are pivoted together. Similarly, in an alternate embodiment the latch 165 will engage the receiver 167 to lock the first housing portion 114 to the second housing portion 116. In the first embodiment, the user then pivots the seat 30 down to have the second end 58 of the seat 30 secured within the recess 60 of the second housing member 16.

The embodiments detailed hereinabove may be combined in full or in part, with any alternative embodiments described.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase (s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the present disclosure may be embodied in other specific forms without departing from the spirit or central characteristics thereof. The present examples and embodiments, therefore, are to be considered in all respects as illustrative and not restrictive, and the Claims are not to be limited to the details given herein. Accordingly, while the specific embodiments have been illustrated and described, numerous modifications come to mind without significantly departing from the spirit of the disclosure and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A ride and play ride-on, comprising:

a body having a first housing portion and a second housing portion;

the first housing portion having a first end, a second end, an inner side, an outer side, a top and a bottom, the first housing portion also having a front wheel rotationally secured to the first housing portion adjacent the bottom and the first end thereof, and a rear wheel rotationally secured to the first housing portion adjacent the bottom and the second end thereof;

the second housing portion having a first end, a second end, an inner side and an outer side, a top and a bottom, the second housing portion also having a front wheel rotationally secured to the second housing portion adjacent the bottom and the first end thereof, and a rear wheel rotationally secured to the second housing portion adjacent the bottom and the second end thereof;

a hinge pivotally connecting the first and second housing portions at the second ends of the first and second housing portions, wherein the ride-on has a first mode where the inner side of the first housing portion is adjacent the inner side of the second housing portion, and wherein the ride-on has a second mode where the first housing portion is pivoted away from the second housing portion at the hinge;

a latch extending from one of the first end of the first housing portion and the first end of the second housing portion, a receiver at the other of the first end of the first housing portion and the first end of the second housing portion, wherein the latch engages the receiver when the ride-on is in the first mode, and wherein the latch can be disengaged from the receiver in the second mode to allow the first housing portion to be pivoted away from the second housing portion at the hinge; and, a steering wheel extending from the top of one of the first housing portion and the second housing portion, the steering wheel being disassociated from the front wheels.

2. The ride and play ride-on of claim 1, wherein the front wheel rotationally secured to the first housing portion at the first end thereof is adjacent the outer side of the first housing portion, and wherein the rear wheel rotationally secured to the first housing portion at the second end thereof is adjacent the outer side of the first housing portion.

3. The ride and play ride-on of claim 2, wherein the front wheel rotationally secured to the second housing portion adjacent the first end thereof is also adjacent the outer side of the second housing portion, and wherein the rear wheel rotationally secured to the second housing portion adjacent the second end thereof is also adjacent the outer side of the second housing portion.

4. The ride and play ride-on of claim 1, further comprising a seat at the top of the first and second housing portions between the first end and the second end of the first and second housing portions.

5. The ride and play ride-on of claim 4, wherein a portion of the seat comprises a cover for a storage cavity.

6. The ride and play ride-on of claim 4, further having a seat back formed by an upper surface of the first and second housing portions.

7. The ride and play ride-on of claim 1, further comprising magnets on the inner side of one of the first and second housing portions to assist in securing the first and second housing portions together in the first mode.

8. The ride and play ride-on of claim 1, wherein the body has a cavity that extends into the first housing portion at the inner side thereof and into the second housing portion at the inner side thereof.

9. The ride and play ride-on of claim 8, further comprising a fold down floor pivotally connected to one of the first and second housing portions, the fold down floor pivoting from an up position within the cavity to a lowered position to form a floor extending from one of the first and second housing portions when the ride-on is in the second mode.

10. A ride and play ride-on, comprising:

a body having a first housing portion, a second housing portion, and a cavity therebetween;

the first housing portion having a first end, a second end, an inner side, an outer side, a top and a bottom, the first housing portion also having a front wheel rotationally secured to the first housing portion adjacent the bottom and the first end thereof, and a rear wheel rotationally secured to the first housing portion adjacent the bottom and the second end thereof;

the second housing portion having a first end, a second end, an inner side and an outer side, a top and a bottom, the second housing portion also having a front wheel rotationally secured to the second housing adjacent the bottom and the first end thereof, and a rear wheel rotationally secured to the second housing portion adjacent the bottom and the second end thereof;

a hinge pivotally connecting the first and second housing portions at the second ends of the first and second housing portions, wherein the ride-on has a first mode where the inner side of the first housing portion is adjacent the inner side of the second housing portion, and wherein the ride-on has a second mode where the first housing portion is pivoted away from the second housing portion at the hinge;

a latch extending from one of the first end of the first housing portion and the first end of the second housing portion, a receiver at the other of the first end of the first housing portion and the first end of the second housing portion, wherein the latch engages the receiver when the ride-on is in the first mode, and wherein the latch can be disengaged from the receiver in the second mode to allow the first housing portion to be pivoted away from the second housing portion at the hinge; and, a seat at the top of the first and second housing portions between the first end and the second end of the first and second housing portions, wherein the seat comprises a first end and a second end, the first end of the seat being pivotally connected to the first housing portion adjacent the outer side of the top of the first housing portion, the seat being pivotable between an open position and a closed position about an axial axis of the seat.

11. The ride and play ride-on of claim 10, further comprising a steering wheel extending from the top of one of the first housing portion and the second housing portion.

12. The ride and play ride-on of claim 10, wherein the cavity extends into the first housing portion adjacent the inner side thereof and into the second housing portion adjacent the inner side thereof.

13. The ride and play ride-on of claim 12, further comprising a fold down floor pivotally connected to one of the first and second housing portions, the fold down floor pivoting from an up position within the cavity to a lowered position to form a floor extending from one of the first and second housing portions when the ride-on is in the second mode.

14. The ride and play ride-on of claim 10, further having a seat back formed by an upper surface of the first and second housing portions.

15. The ride and play ride-on of claim 10, wherein a portion of the seat comprises a cover for a storage cavity.

16. A ride and play ride-on, comprising:

a body having a first housing portion and a second housing portion;

the first housing portion having a first end, a second end, an inner side, an outer side, a top and a bottom, the first housing portion also having a front wheel rotationally secured to the first housing portion, and a rear wheel rotationally secured to the first housing portion;

the second housing portion having a first end, a second end, an inner side and an outer side, a top and a bottom, the second housing portion also having a front wheel rotationally secured to the second housing portion, and a rear wheel rotationally secured to the second housing portion;

wherein the body has a first cavity that extends into the first housing portion adjacent the inner side thereof and into the second housing portion adjacent the inner side thereof;

a hinge pivotally connecting the first and second housing portions at the second ends of the first and second housing portions, wherein the ride-on has a first mode where the inner side of the first housing portion is adjacent the inner side of the second housing portion, and wherein the ride-on has a second mode where the first housing portion is pivoted away from the second housing portion at the hinge; and, a latch extending from one of the first end of the first housing portion and the first end of the second housing portion, a receiver at the other of the first end of the first housing portion and the first end of the second housing portion, wherein the latch engages the receiver when the ride-on is in the first mode, wherein the latch can be disengaged from the receiver in the second mode to allow the first housing portion to be pivoted away from the second housing portion at the hinge, and wherein a portion of the seat comprises a cover for a storage cavity, the storage cavity being a distinct cavity from the first cavity.

17. The ride and play ride-on of claim 16, further comprising a steering wheel extending from the top of one of the first housing portion and the second housing portion.

18. The ride and play ride-on of claim 16, further comprising a seat at the top of the first and second housing portions between the first end and the second end of the first and second housing portions.

19. The ride and play ride-on of claim 18, further having a seat back formed by an upper surface of the first and second housing portions.

* * * * *